Feb. 26, 1952 T. E. PIAZZE 2,587,211
TUBE FORMER
Filed Aug. 17, 1948 3 Sheets—Sheet 1
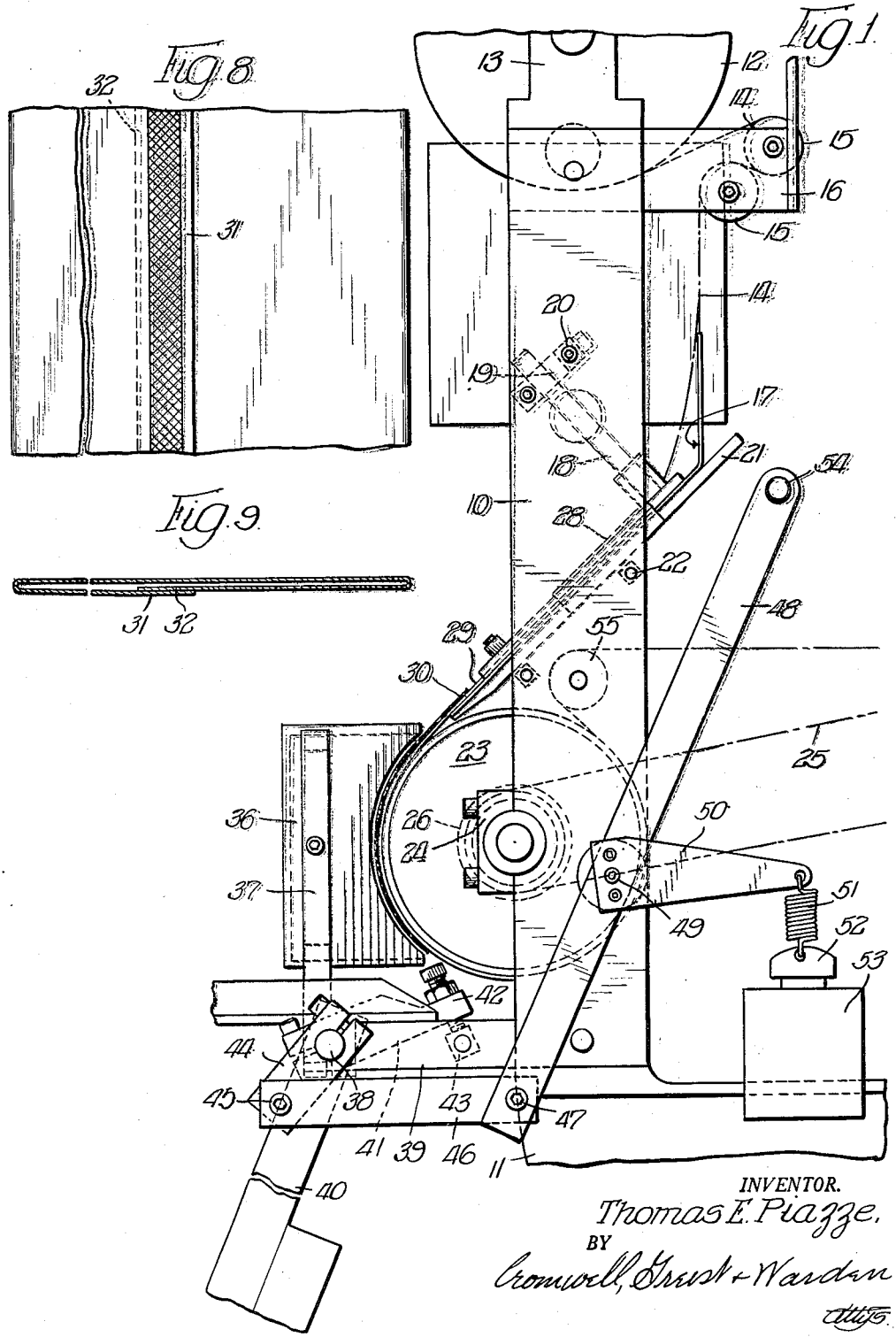
INVENTOR.
Thomas E. Piazze,
BY
Cromwell, Greist & Warden
Attys.

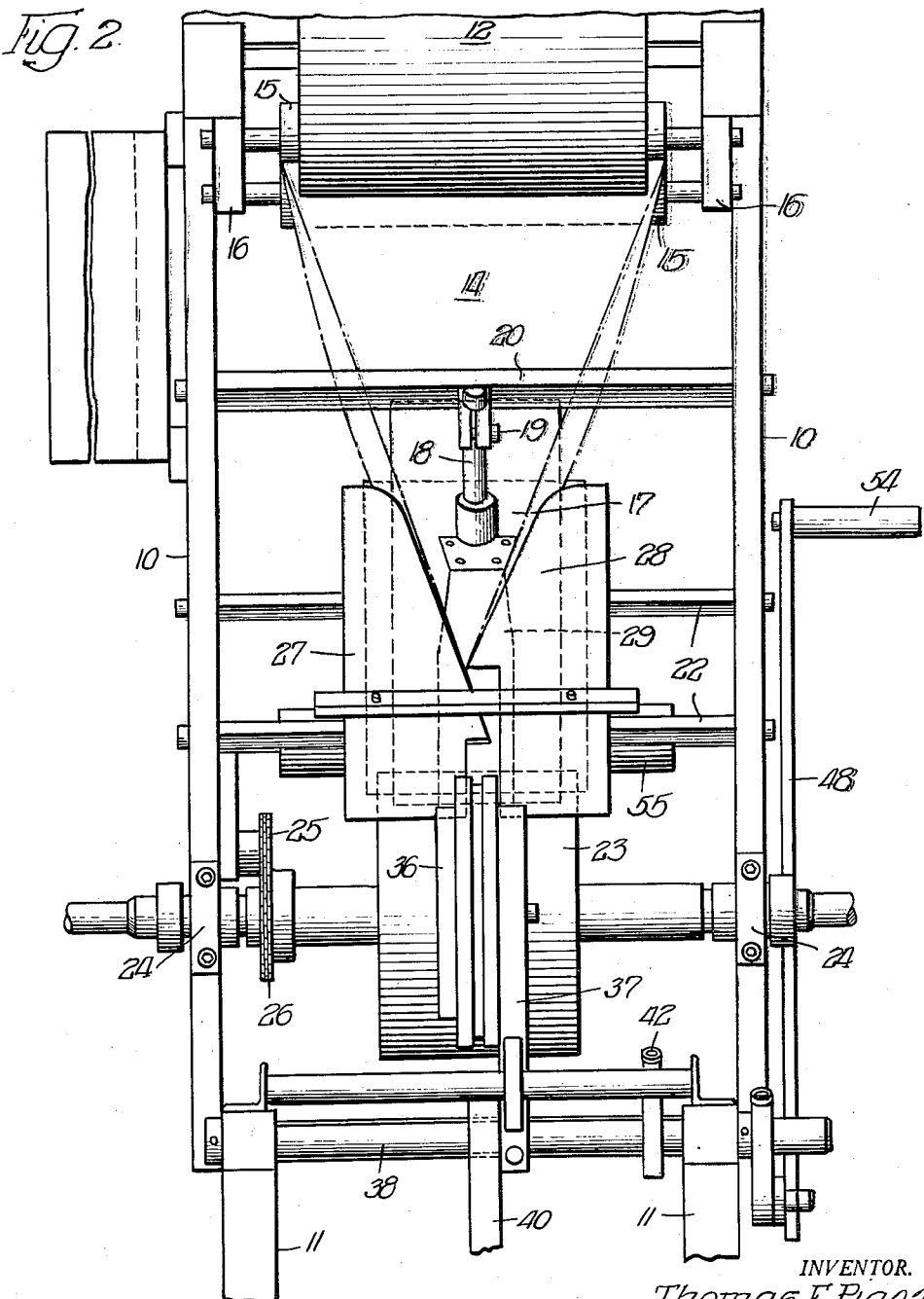

Feb. 26, 1952 T. E. PIAZZE 2,587,211
TUBE FORMER
Filed Aug. 17, 1948 3 Sheets-Sheet 3
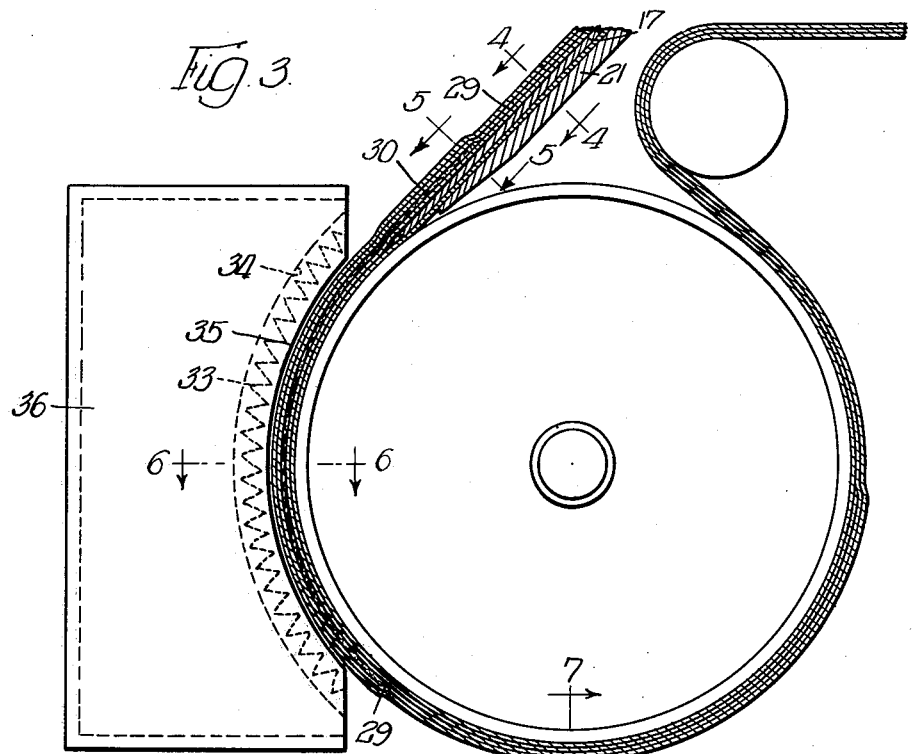
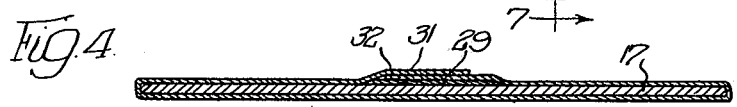
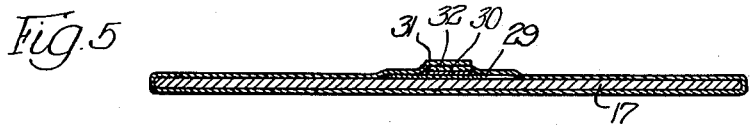
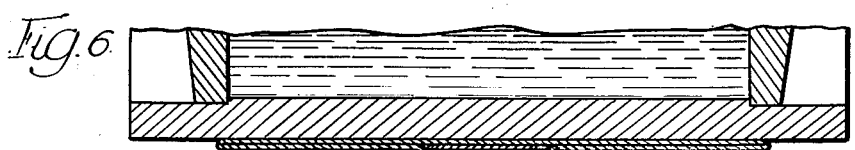
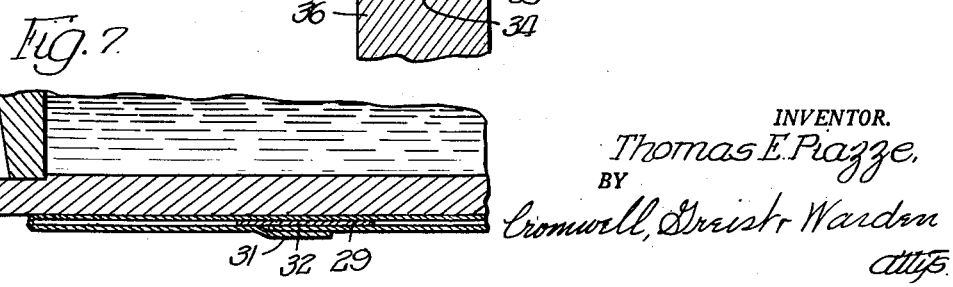
INVENTOR.
Thomas E. Piazze,
BY
Cromwell, Grist & Warden
Attys.

Patented Feb. 26, 1952

2,587,211

UNITED STATES PATENT OFFICE 2,587,211

TUBE FORMER

Thomas E. Piazze, Mount Vernon, Ohio, assignor to Shellmar Products Corporation, Chicago, Ill., a corporation of Delaware Application August 17, 1948, Serial No. 44,767

11 Claims. (Cl. 154—1.8)

This invention is concerned with a method and machine for continuously fabricating a tube from a web of heat sealable material.

It is an object of the invention to provide a method and a machine for forming a tube from a web of heat sealable material wherein the margins of the web are overlapped and sealed by radiant heat.

It is another object of the invention to provide a method of forming a seam wherein marginal portions of a web of heat sealable material are guided into overlapping relation, and the material is carried around a curved surface with the overlapped margins placed under sufficient tension to hold them in surface engaging relation while being subjected to radiant heat to seal the same.

It is a more specific object of the invention to provide a method and a machine for the purpose described wherein a web of heat sealable material such as extruded or cast film plastic sheet material is folded over a former plate to bring the marginal portions of the material into overlapping relation, the folded material is carried around a cooled drum to provide sufficient tension in the overlapped marginal portions to hold them in surface engagement while they are welded by a radiant heating drum and a heat blocking plate is extended from the former plate in spaced relation around a portion of the drum between the overlapped portions and the opposite wall of the material while the overlapped portions are welded to form the seal.

It is a further object of the invention to provide a tube forming machine comprising a former plate having means for folding a web of heat sealable material into a tube with the marginal portions of the material in overlapped seam forming relation, a cooled drum for receiving the folded material from the former plate with the overlapped portions outermost, a relatively flexible resilient extension on the former plate adapted to assume the same curvature as the drum located beneath the overlapped portions of the material, and a movable radiant heat sealing member for welding the marginal portions of the material into a seam.

A still further object of the invention is to provide a tube forming machine of the character described having a relatively narrow strip of non-heat-conducting material arranged between the overlapped seam forming portion of the material and the resilient former plate extension for retaining greater peripheral differential between the seam portions and the opposite wall of the material as the tube is carried around the drum and thereby insuring a more uniform weld of the seam.

These and other objects of the invention will be apparent from a consideration of the method herein described and the mechanism which is ilustrated in the accompanying drawings as particularly adapted to carry out the steps of the method.

In the drawings:

Fig. 1 is a side elevation of a tube forming mechanism incorporating therein the principles of the invention;

Fig. 2 is a front elevation of the mechanism;

Fig. 3 is an enlarged sectional detail view showing the cooling drum and the radiant heat sealing device in operative seal-forming position;

Fig. 4 is a section taken on the line 4—4 of Fig. 3;

Fig. 5 is a section taken on the line 5—5 of Fig. 3;

Fig. 6 is a section taken on the line 6—6 of Fig. 3;

Fig. 7 is a section taken on the line 7—7 of Fig. 3;

Fig. 8 is a portion of a completely formed continuous tube; and

Fig. 9 is a cross section of the continuous tube.

The apparatus disclosed in the drawing is adapted to fabricate a tube from elastomeric heat sealable material such as polyethylene, "Pliofilm" or the like, which is suitable for use with a bag making machine of the general character set out in my copending application, now Patent No. 2,475,359, granted July 5, 1949. However, the mechanism may be employed for the production of a tube from any suitable material for any other use.

Sheets or webs formed from many materials such as polyethylene and "Pliofilm" which are elastomeric, that is, which have a certain amount of stretch or elasticity, seldom have uniform and straight edges. Generally the edges are ruffled or wrinkled and are not the same length for a given length of material. One edge is generally longer than the other, particularly, in extruded or cast film plastic sheet or web material. When webs of such material are formed into a flat tube with the marginal edges overlapped to provide the seam the overlapped portions do not lie flat on each other at all points but tend to separate and pull away from each other thus making it difficult to heat seal the seam. In the mechanism which is described herewith the web is formed into a flat tube and then curved longitudinally around a relatively large drum to place the tube under longitudinal tension with the overlapped marginal edges on the outside away from the surface of the drum to provide a peripheral differential and obtain sufficient longitudinal tension in the overlapped portions to hold the material in surface contact while radiant heat is applied to form the seam.

The illustrated tube forming mechanism is supported on a frame comprising vertical uprights 10 which are laterally spaced the necessary width depending upon the size of the tube desired. The uprights 10 are supported at their base on a portion 11 of the frame of the bag making machine or other support. A supply roll 12 of the tube forming material is mounted in suitable supporting brackets 13 at the top of the uprights 10 and the web 14 is fed therefrom between a pair of guide rollers 15 supported laterally of the uprights 10 on the frame structure 16. The web 14 is fed downwardly from the lower guide roller 15 beneath a tube forming plate 17 which is supported by a post 18 adjustably mounted on the bracket 19 which is attached to a transverse bar 20. The plate 17 is spaced from a base plate 21 which is angularly supported by the bracket 22 on the vertical frame members 10. The lower portion of the base plate 21 terminates in generally tangential relation with a rotatable drum member 23 which is journaled in brackets 24 supported on the vertical frame members 10. The drum member 23 is rotated by means of a drive belt or chain 25 and a pulley or sprocket 26, the belt 25 being powered from a suitable rotating member on the bag making machine. The drum 23 is preferably supplied with a cooling fluid in any conventional manner.

The web 14 passes between the tube former 17 and the base plate 21 and is folded around the former 17 by the side plates 27 and 28 to bring the marginal edges thereof into overlapping seam forming relation. The former 17 is provided with a relatively narrow extension 29 of thin flat material such as stainless steel, or the like, which is normally straight but which is adapted to be curved around a portion of the periphery of the drum 23 by the tubed material. This plate which may be formed of any relatively thin flexible material which is a good heat conductor forms a heat block for rapidly cooling the inside surface of the tube. The extension 29 is preferably provided on its outer face with a rib forming member 30 which is a poor heat conductor such as felt or similar material. The rib 30, which is the width of the desired seam, is relatively thin and is positioned under the overlapping margins 31 and 32 of the material and to place the same under longitudinal tension so that the surfaces of the material are pressed against each other as the overlapped margins 31 and 32 pass through the heating zone and are subjected to radiant heat of sufficient intensity to weld the surfaces of the material together into a permanent seam structure. While the rib 30 may be omitted, a seam of more uniform character is formed when it is used since it defines the seam area and provides greater peripheral differential.

Radiant heat is provided for the sealing operation by a heating element 33 which is carried in a groove 34 provided in the curved surface 35 of a block 36 which is adapted to be positioned in spaced relation to the seam forming portions 31 and 32 of the traveling material. The block 36 is attached to side supports 37 which are secured to a cross shaft 38 journaled in brackets 39. The shaft 38 is supplied with a weight carrying arm 40 which tends to pivot the block 36 away from the heat sealing position adjacent the drum 23. The shaft 38 is provided with an arm 41 on the end of which an adjustable stop member 42 is positioned for engagement with a stop block 43 secured on one of the brackets 39. The shaft 38 is also provided with an arm 44 which is pivoted at 45 to one end of a link 46, the other end of the link being pivoted at 47 to the lower end of a hand bar 48.

The bar 48 is pivoted at 49 to an upright 10 and is supplied with a laterally extending rigid arm 50 connected by a spring member 51 to the movable element 52 of a solenoid 53 which is electrically connected to appropriate mechanism in the bag machine for releasing the element 52 upon the stopping of the bag machine thereby permitting the weighted arm 40 to rotate the shaft 38 and pivot the block 36 away from the drum 23. The hand bar 48 is supplied with a hand grip member 54 for manually pivoting the block 36 into heat sealing position when desired, the solenoid 53 being operative to hold the heat sealing block 36 in operative position by means of the connection of the movable element 52 with the arm 50 while the bag making machine is in operation.

The curved surface of the block 36 extends around one side of the drum 23. The rib member 30 extends beneath the seam forming portions 31 and 32 of the material approximately the same distance around the drum 23 as the block 36 while the extension plate 29 extends a substantial distance beyond the end of the rib member 30 to prevent the fully sealed seam material from sticking to the opposite wall of the tube. The fully formed and sealed tube leaves the drum 23 and passes around the guide roller 55 from which it is delivered to the bag making machine.

With the apparatus described the overlapped marginal seam forming portions are not disturbed by the heat sealing device. The welding speed may be much greater than where the material is contacted by a heated shoe. The diameter of the drum and the length of the radiant heater may be varied to vary the speed of sealing. By using the radiant heater the heat is applied more gently at the start and gradually increased to fusion temperature. The heat is not applied fully at the start as when a heated shoe is used.

While particular materials and specific details of construction have been referred to in describing the illustrated form of the invention, other materials and other details of construction may be resorted to within the spirit of the invention.

I claim:

1. A method of continuously forming a tube from a web of heat sealable material comprising folding the material to bring the marginal portions thereof into overlapping seam forming relation, passing the folded material around a curved surface while maintaining the marginal portions in overlapped relation to place said marginal portions under sufficient longitudinal tension to hold the same in surface engaging relation, and subjecting the overlapped marginal portions to radiant heat to seal the same.

2. A method of continuously forming a tube from a web of heat sealable elastomeric material comprising folding the material into a relatively flat tube with the marginal portions of the material in overlapping longitudinal seam forming relation, maintaining the opposed walls of the tube in spaced relation while guiding the tube in a curved path with the overlapped marginal portions outwardly to place said portions under longitudinal tension and thereby hold said portions in close surface contact, and subjecting said portions to radiant heat to seal the same.

3. A machine for forming a tube from a web of heat sealable sheet material comprising a former plate, means for folding the material around the former plate to bring marginal portions of the material into overlapping seam forming relation, a cooled drum, said former plate having an extension bent around a portion of the periphery of said drum in spaced relation to the surface of the same for guiding the folded material in a curved path around said drum, a relatively thin narrow non-heat conducting member arranged on said former plate extension and projecting around a portion of the periphery of said drum, said member being adapted to longitudinally tension the overlapped margins of the material, and a radiant heat sealing device movable into predetermined position in spaced relation to the surface of said member for heat sealing said overlapped margins while the same are held in surface engagement.

4. A machine for forming a tube from heat sealable material comprising a cooling drum, a former plate, a curved extension on said former plate arranged in spaced relation to a portion of the surface of said drum, a relatively narrow rib-forming member on said former plate extension and an arcuate radiant heat sealing device arranged in spaced relation to said member, whereby the material may be folded around the former plate to bring the marginal portions into seam forming relation between said member and the heat sealing device for welding said marginal portions into a seam while they are maintained under tension and in close surface contact.

5. A tube forming device comprising laterally spaced vertical frame members, means for supporting a web of heat sealable material adjacent the top of said frame members, a cooled rotatable drum mounted adjacent the base of said frame members, a former plate mounted above said drum and arranged in tangential relation to the surface of the same, means for folding the material into a tube around the former plate with marginal portions of the material in overlapped relation, a resilient plate-like extension on said former plate adapted to extend partially around the periphery of said drum and to guide the folded material around said drum with overlapped marginal portions separated from the opposite tube wall, a relatively narrow thin non-heat transferring member intermediate the side margins of said curved extension, and an arcuate radiant heat sealing device spaced from said member whereby the overlapped margins of the material will be held in close surface contact while they are heat sealed.

6. A tube forming device comprising laterally spaced vertical frame members, means for supporting a web of heat sealable material adjacent the top of said frame members, a cooled rotatable drum mounted adjacent the base of said frame members, a former plate mounted above said drum in angular relation to said frame members, the lower end of said former plate extending to a point adjacent the surface of said drum, side plates for folding the material into a tube around the former plate with marginal portions of the material in overlapped relation, a curved extension on the lower end of said former plate, said curved extension being spaced from the periphery of said drum a sufficient distance to accommodate a single thickness of the folded tube material, a relatively flat narrow rib of resilient material intermediate the margins of said curved extension, a sealing device having an arcuate surface in opposed relation to said rib, and a radiant heating element in said device for heat sealing the overlapped margins of the material while the same are held in close surface contact by longitudinal tension as the tube moves around said drum.

7. A machine for continuously forming a tube from a web of heat sealable material comprising a former plate, a cooling drum mounted for rotation adjacent the lower end of said former plate, a curved extension on said former plate arranged in spaced relation to a portion of the surface of said drum, a relatively narrow felt rib member on said former plate extension, and a radiant heat sealing device having an arcuate surface arranged in spaced relation to said rib member whereby the web may be folded around the former plate to bring the marginal portions into seam forming relation and then passed between the rib member and the heat sealing device with said marginal portions maintained under longitudinal tension and in close surface contact while they are heat sealed.

8. A machine for forming a tube from a web of heat sealable sheet material comprising a former plate, means for folding the material around the former plate to bring marginal portions of the material into overlapping seam forming relation, a rotatable cooled drum associated with said former plate, said former plate having a portion extending around a portion of the periphery of said drum in spaced relation to the surface of the same for guiding the folded material around said drum, a relatively narrow rib member projecting outwardly of said former plate to longitudinally tension the overlapped margins of the material, and a radiant heat sealing device movable into a predetermined position in spaced relation to said rib member for heat sealing said overlapped margins while the same are held in surface engagement by said tension.

9. A machine as recited in claim 8 wherein said heat sealing device comprises a pivotally mounted block having a curved surface, said curved surface being provided with a groove and a heating element in said groove.

10. A machine for continuously forming a tube from a web of heat sealable elastomeric material comprising means for folding the material into a relatively flat tube with marginal portions of the material in overlapping longitudinal seam forming relation, means for maintaining the opposed walls of the tube in spaced relation, curved means for guiding the tube in a continuous path with the overlapped marginal portions positioned outwardly to place said portions under longitudinal tension and thereby hold said portions in close surface contact, and radiant heating means spaced around a portion of said curved guiding means to seal the overlapped marginal portions.

11. A tube forming device comprising supporting frame members, means for mounting a web of heat sealable material on said frame members, a cooled rotatable drum mounted on said frame members, a former plate mounted adjacent said drum, said former plate extending to a point adjacent the surface of said drum, means for folding the material into a tube around the former plate with marginal portions of the material in overlapped relation, a relatively flexible resilient extension on the end of said former plate, said extension being arranged to assume a curved position relative to the periphery of said drum and spaced a sufficient distance from the surface thereof to accommodate a single thickness of the folded tube material, a relatively flat narrow strip of resilient material arranged intermediate the side margins of said extension, a sealing device having an arcuate surface movable into opposed relation to said strip, and a radiant heating element in said device for heat sealing the overlapped margins of the material while the same are held in close surface contact by longitudinal tension as the tube moves around said drum.

THOMAS E. PIAZZE.

REFERENCES CITED

The following references are of record in the file of this patent:

UNITED STATES PATENTS

| Number | Name | Date |
|---|---|---|
| 2,157,732 | Piazze | May 9, 1939 |
| 2,170,364 | Bergstein | Aug. 22, 1939 |
| 2,514,013 | Sailer | July 4, 1940 |
| 2,358,455 | Hallman | Sept. 19, 1944 |
| 2,440,664 | Irons | Apr. 27, 1948 |
| 2,461,372 | Collins | Feb. 8, 1949 |
| 2,491,048 | Jenkins | Dec. 13, 1949 |